US012573614B2

(12) United States Patent
Heo et al.

(10) Patent No.: US 12,573,614 B2
(45) Date of Patent: Mar. 10, 2026

(54) LITHIUM SECONDARY BATTERY, BATTERY PACK AND ELECTRONIC DEVICE INCLUDING SAME

(71) Applicant: LG ENERGY SOLUTION, LTD., Seoul (KR)

(72) Inventors: Bumgi Heo, Daejeon (KR); Sun Young Shin, Daejeon (KR); Sang Wook Lee, Daejeon (KR); Yong Ju Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/540,744

(22) Filed: Dec. 14, 2023

(65) Prior Publication Data

US 2024/0213450 A1 Jun. 27, 2024

(30) Foreign Application Priority Data

Dec. 16, 2022 (KR) ........................ 10-2022-0177120

(51) Int. Cl.

| | |
|---|---|
| ***H01M 4/36*** | (2006.01) |
| ***H01M 4/02*** | (2006.01) |
| ***H01M 4/131*** | (2010.01) |
| ***H01M 4/133*** | (2010.01) |
| ***H01M 4/134*** | (2010.01) |
| ***H01M 4/38*** | (2006.01) |
| ***H01M 4/505*** | (2010.01) |
| ***H01M 4/525*** | (2010.01) |
| ***H01M 4/587*** | (2010.01) |
| ***H01M 10/052*** | (2010.01) |

(52) U.S. Cl.

CPC ........... *H01M 4/364* (2013.01); *H01M 4/131* (2013.01); *H01M 4/133* (2013.01); *H01M 4/134* (2013.01); *H01M 4/386* (2013.01); *H01M 4/505* (2013.01); *H01M 4/525* (2013.01); *H01M 4/587* (2013.01); *H01M 10/052* (2013.01); *H01M 2004/021* (2013.01)

(58) Field of Classification Search

CPC ..... H01M 4/131-1315; H01M 4/1391-13915; H01M 4/505; H01M 4/525; H01M 4/133; H01M 4/1393; H01M 4/583-587; H01M 4/134; H01M 4/1395; H01M 4/386; H01M 4/362-366

See application file for complete search history.

(56) References Cited

U.S. PATENT DOCUMENTS

| | | | | |
|---|---|---|---|---|
| 2008/0124631 A1* | 5/2008 | Fukui | H01M 4/38 | 427/58 |
| 2013/0302688 A1* | 11/2013 | Takezawa | H01M 10/0525 | 429/231.1 |
| 2015/0243982 A1* | 8/2015 | Hiratsuka | H01M 4/525 | 429/223 |
| 2016/0118655 A1 | 4/2016 | Yoshikawa et al. | | |
| 2017/0040602 A1 | 2/2017 | Ha et al. | | |
| 2018/0269519 A1* | 9/2018 | Jo | C01B 33/02 | |
| 2018/0316001 A1 | 11/2018 | Kim et al. | | |
| 2019/0115586 A1 | 4/2019 | Kamo et al. | | |
| 2020/0295368 A1 | 9/2020 | Kong et al. | | |
| 2020/0411844 A1* | 12/2020 | Oh | H01M 4/134 | |
| 2021/0013493 A1 | 1/2021 | Cho et al. | | |
| 2021/0111396 A1 | 4/2021 | Choi et al. | | |
| 2021/0135187 A1 | 5/2021 | Park et al. | | |
| 2021/0384502 A1 | 12/2021 | Lee et al. | | |
| 2022/0140320 A1 | 5/2022 | Jin et al. | | |
| 2022/0149346 A1 | 5/2022 | Lee et al. | | |
| 2022/0181615 A1* | 6/2022 | Lee | H01M 4/525 | |
| 2023/0155123 A1* | 5/2023 | Lee | C01G 53/50 | 429/223 |
| 2023/0155127 A1 | 5/2023 | Kim et al. | | |

FOREIGN PATENT DOCUMENTS

| | | | | |
|---|---|---|---|---|
| CN | 115425222 A | 12/2022 | | |
| JP | WO2017-179457 A1 | 10/2017 | | |
| KR | 10-2017-0018208 A | 2/2017 | | |
| KR | 10-2018-0120486 A | 11/2018 | | |
| KR | 10-2020-0110027 A | 9/2020 | | |
| KR | 2021-0000983 A | 1/2021 | | |
| KR | 2021-0007273 A | 1/2021 | | |
| KR | 2021-0019389 A | 2/2021 | | |
| KR | 10-2021-0042484 A | 4/2021 | | |
| KR | 10-2021-0150863 A | 12/2021 | | |
| KR | 10-2022-0062974 A | 5/2022 | | |
| KR | 2022-0061035 A | 5/2022 | | |
| KR | 2022-0110122 A | 8/2022 | | |
| KR | 10-2022-0132491 A | 9/2022 | | |
| WO | WO-2021125535 A1 * | 6/2021 | C01G 53/006 | |

* cited by examiner

*Primary Examiner* — Robert S Carrico

(74) *Attorney, Agent, or Firm* — Bryan Cave Leighton Paisner LLP

(57) ABSTRACT

Disclosed are a lithium secondary battery, a battery pack and an electronic device. The lithium secondary battery includes: a positive electrode comprising a positive electrode active material; a negative electrode comprising a negative electrode active material; a separator between the positive electrode and the negative electrode; and an electrolyte, wherein the positive electrode active material comprises a lithium transition metal compound comprising nickel (Ni), cobalt (Co) and manganese (Mn), wherein the lithium transition metal compound comprises a form of single particles having at least one of a single primary particle or an aggregate of 2 or more and 30 or less of primary particles, wherein the single particles comprise crystal grains of the lithium transition metal compound therein, wherein the negative electrode active material comprises a silicon carbon composite having Si crystal grains therein, and wherein the size of the Si crystal grains of the silicon carbon composite is 10% or less of the size of the crystal grains of the lithium transition metal compound.

18 Claims, No Drawings

LITHIUM SECONDARY BATTERY, BATTERY PACK AND ELECTRONIC DEVICE INCLUDING SAME

CROSS-REFERENCE TO RELATED APPLICATIONS

This application claims priority to and the benefit of Korean Patent Application No. 10-2022-0177120 filed in the Korean Intellectual Property Office on Dec. 16, 2022, the entire contents of which are incorporated herein by reference.

TECHNICAL FIELD

The present disclosure relates to a lithium secondary battery, a battery pack and an electronic device.

BACKGROUND ART

Recently, with the rapid spread of electronic devices using batteries, such as not only mobile phones, notebook-sized computers, and electric vehicles, but also power tools and cleaners, the demand for small and lightweight secondary batteries having relatively high capacity and/or high output is rapidly increasing. In particular, lithium secondary batteries are lightweight and have high energy density, and thus have attracted attention as driving power sources for electronic devices. Accordingly, research and development efforts to improve the performance of lithium secondary batteries have been actively conducted.

The lithium secondary battery generates electric energy by oxidation and reduction reactions during intercalation and deintercalation of lithium ions at a positive electrode and a negative electrode in a state in which an organic electrolytic solution or polymer electrolytic solution is filled between the positive electrode and the negative electrode, which are composed of active materials capable of intercalating and deintercalating lithium ions.

Lithium cobalt oxide ($LiCoO_2$), lithium nickel oxide ($LiNiO_2$), lithium manganese oxide ($LiMnO_2$, $LiMn_2O_4$, and the like), a lithium iron phosphate compound ($LiFePO_4$) and the like have been used as a positive electrode active material of a lithium secondary battery. Among them, lithium cobalt oxide ($LiCoO_2$) is widely used because of advantages of high operating voltage and excellent capacity characteristics, and is applied as a high voltage positive electrode active material. However, due to rising prices and unstable supply of cobalt (Co), there is a limit to its large-scale usage as a power source in fields such as electric vehicles, so there is an emerging need for developing a positive electrode active material capable of replacing cobalt.

Accordingly, a nickel-cobalt-manganese-based lithium transition metal compound (hereinafter simply referred to as 'NCM-based lithium transition metal compound') in which a part of cobalt (Co) is substituted with nickel (Ni) and manganese (Mn) has been developed. Recently, research has been conducted to increase the capacity of NCM-based lithium transition metal compound by increasing the content of Ni in the compound. However, a Ni-rich positive electrode active material with a high nickel content has disadvantages such as increase in resistance and increase in gas generation due to deterioration in thermal stability and increase in side reactions during electrochemical reactions.

Meanwhile, although graphite is usually used as a negative electrode active material for a lithium secondary battery, it is difficult to increase the capacity of the lithium secondary battery because graphite has a small capacity per unit mass of 372 mAh/g. Accordingly, in order to increase the capacity of a lithium secondary battery, negative electrode materials such as silicon, tin and oxides thereof have been developed as non-carbon-based negative electrode materials having higher energy density than graphite. However, although these non-carbon-based negative electrode materials have a large capacity, these materials have a problem in that the amount of lithium consumed is large and the irreversible capacity loss is large during the initial charging and discharging due to the low initial efficiency.

A lithium secondary battery has a size required by its use, and accordingly, the lithium secondary battery needs to be designed within a limited space. Although consumer demand for increase in energy density and improvement in high output performance is increasing, there is no choice but to increase the content of negative electrode materials to meet the demand when a high-capacity positive electrode material is used, so that there is a limit to increasing the battery efficiency within a limited space. Accordingly, there is a need for developing a battery with improved performance such as efficiency and service life within a limited space.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present inventors have found that in a lithium secondary battery designed within a limited space, optimum battery performance can be implemented in a specific combination by regulating the size of the crystal grains of a positive electrode active material and the size of the Si crystal grains of a negative electrode active material, thereby leading to the present disclosure.

The present disclosure has been made in an effort to provide a lithium secondary battery, a battery pack and an electronic device.

An exemplary embodiment of the present disclosure provides a lithium secondary battery including: a positive electrode including a positive electrode active material; a negative electrode including a negative electrode active material; a separator between the positive electrode and the negative electrode; and an electrolyte, wherein the positive electrode active material includes a lithium transition metal compound including nickel (Ni), cobalt (Co) and manganese (Mn), wherein the lithium transition metal compound includes a form of single particles having at least one of a single primary particle or an aggregate of 2 or more and 30 or less of primary particles, wherein the single particles comprise crystal grains of the lithium transition metal compound therein, wherein the negative electrode active material include a silicon carbon composite having Si crystal grains therein, and wherein the size of the Si crystal grains of the silicon carbon composite is 10% or less of the size of the crystal grains of the lithium transition metal compound.

The primary particles may have an average particle diameter ($D_{50}$) of 0.5 μm to 3 μm.

The single particles may have a particle strength of 100 to 300 MPa when rolled with a force of 650 $kgf/cm^2$.

The size of the Si crystal grains of the silicon carbon composite may be 0.1 nm or more and 20 nm or less.

The size of the crystal grains of the lithium transition metal compound may be 100 nm or more and 200 nm or less.

The lithium transition metal compound may further comprise a form of secondary particles which is an aggregate of more than 30 primary particles.

The secondary particles may have an average particle diameter ($D_{50}$) of 1 μm or more and 20 μm or less.

The negative electrode active material may further comprise graphite.

The graphite may comprise a natural graphite, an artificial graphite, or a combination thereof.

The graphite may comprise an artificial graphite and a natural graphite, and a weight ratio of the artificial graphite to the natural graphite is 50:50 to 90:10.

The graphite may have an average particle diameter ($D_{50}$) of 10 μm to 20 μm.

The single particles may have an average particle diameter ($D_{50}$) of 1 μm or more and 12 μm or less.

The silicon carbon composite may have an average particle diameter ($D_{50}$) of 1 μm or more and 15 μm or less.

An average particle diameter ($D_{50}$) of the single particles may be smaller than an average particle diameter ($D_{50}$) of the silicon carbon composite.

An average particle diameter ($D_{50}$) of the silicon carbon composite may be smaller than an average particle diameter ($D_{50}$) of the graphite.

The single particles may be comprised in an amount of 15 parts by weight to 100 parts by weight with respect to 100 parts by weight of the positive electrode active material, and the silicon carbon composite may be comprised in an amount of 3 parts by weight to 30 parts by weight with respect to 100 parts by weight of the negative electrode active material.

The lithium transition metal compound may comprise 80 mol % or more and less than 100 mol % of nickel among the metals except for lithium.

The positive electrode may comprise a positive electrode active material layer comprising the positive electrode active material, the negative electrode may comprise a negative electrode active material layer comprising the negative electrode active material, and the positive electrode active material layer and the negative electrode active material layer may have a thickness of 10 μm or more and 500 μm or less, respectively. Another exemplary embodiment of the present disclosure provides a battery pack including: a lithium secondary battery, wherein the lithium secondary battery comprises:

a positive electrode comprising a positive electrode active material; a negative electrode comprising a negative electrode active material; a separator between the positive electrode and the negative electrode; and an electrolyte, wherein the positive electrode active material comprises a lithium transition metal compound comprising nickel (Ni), cobalt (Co) and manganese (Mn), wherein the lithium transition metal compound comprises a form of single particles having at least one of a single primary particle or an aggregate of 2 or more and 30 or less of primary particles, wherein the single particles comprise crystal grains of the lithium transition metal compound therein, wherein the negative electrode active material comprises a silicon carbon composite having Si crystal grains therein, and wherein the size of the Si crystal grains of the silicon carbon composite is 10% or less of the size of the crystal grains of the lithium transition metal compound. Yet another exemplary embodiment of the present disclosure provides an electronic device, including: the above-described lithium secondary battery.

In the lithium secondary battery according to an exemplary embodiment of the present disclosure, the size of the Si crystal grains of a silicon carbon composite included in a negative electrode active material is 10% or less of the size of the crystal grains of a lithium transition metal compound included in a positive electrode active material, and when the size of the crystal grains is satisfied, cycle characteristics and swelling performance can be improved. Therefore, the rapid charging performance, efficiency, service life and/or energy density of a lithium secondary battery designed within a limited space can be easily improved by regulating the crystal grains of the lithium transition metal compound and the Si crystal grains of the negative electrode active material.

DETAILED DESCRIPTION

Hereinafter, the present disclosure will be described in more detail.

When one part "includes" one constituent element in the present specification, unless otherwise specifically described, this does not mean that another constituent element is excluded, but means that another constituent element may be further included.

When one member is disposed "on" another member in the present specification, this includes not only a case where the one member is brought into contact with another member, but also a case where still another member is present between the two members.

Terms or words used in the specification should not be interpreted as being limited to typical or dictionary meaning and should be interpreted with a meaning and a concept which conform to the technical spirit of the present disclosure based on the principle that an inventor can appropriately define a concept of a term in order to describe his/her own invention in the best way.

Singular expressions of the terms used in the present specification include plural expressions unless they have definitely opposite meanings in the context.

In the present specification, "single particle" is a term used to distinguish single particles from the positive electrode active material particles in the form of secondary particles formed by aggregation of more than 30 of primary particles in the related art, and is meant to include the form of a single particle composed of one primary particle and a pseudo-single particle which is an aggregate of 30 or less primary particles.

In the present specification, an average particle diameter ($D_{50}$) may be defined as a particle diameter corresponding to 50% of a cumulative volume in a particle size distribution curve (graph curve of the particle size distribution map) of the particles. The average particle diameter may be measured using, for example, a laser diffraction method. The laser diffraction method can generally measure a particle diameter of about several mm from the submicron region, and results with high reproducibility and high resolution may be obtained.

The measurement of the average particle diameter may be confirmed using water and Triton-X100 dispersant using a Microtrac apparatus (manufacturer: Microtrac model name: S3500). Specifically, the average particle diameter of the positive electrode active material may be measured in a range of a refractive index of 1.5 to 1.7, and the negative electrode active material may be measured under the condition of a refractive index of 1.97 or 2.42. For example, after particles are dispersed in a dispersion medium, the resulting dispersion is introduced into a commercially available laser diffraction particle size measuring device to irradiate the dispersion with an ultrasonic wave of about 28 kHz with an output of 60 W, then a volume cumulative particle size distribution graph is obtained, and then the average particle diameter may be measured by obtaining the particle size corresponding to 50% of the volume cumulative amount.

Hereinafter, preferred exemplary embodiments of the present disclosure will be described in detail. However, the exemplary embodiments of the present disclosure may be modified into various other forms, and the scope of the present disclosure is not limited to the exemplary embodiments which will be described below.

An exemplary embodiment of the present disclosure provides a lithium secondary battery including: a positive electrode including a positive electrode active material; a negative electrode including a negative electrode active material; a separator between the positive electrode and the negative electrode; and an electrolyte, in which the positive electrode active material includes a lithium transition metal compound including nickel (Ni), cobalt (Co) and manganese (Mn), the lithium transition metal compound includes a form of single particles having at least one of a single primary particle or an aggregate of 2 or more and 30 or less of primary particles, the single particles comprise crystal grains of the lithium transition metal compound therein, the negative electrode active material includes a silicon carbon composite having Si crystal grains therein, and the size of the Si crystal grains of the silicon carbon composite is 10% or less of the size of the crystal grains of the lithium transition metal compound.

In general, a lithium secondary battery has a size required by its use, and needs to be designed within a limited space. Although consumer demand for increase in energy density and improvement in high output performance is increasing, there is no choice but to increase the content of negative electrode materials to meet the demand when a high-capacity positive electrode material is used, so that there is a limit to increasing the battery efficiency within a limited space. In addition, depending on the type of negative electrode material, it is necessary to design a positive electrode material having an efficiency that meets the efficiency of the negative electrode material.

The lithium secondary battery according to the present disclosure is characterized in that the size of the Si crystal grains of a silicon carbon composite included in a negative electrode active material layer is 10% or less of the size of the crystal grains of a lithium transition metal compound included in a positive electrode active material.

Due to the material characteristics of silicon-carbon composites, the larger the size of the crystal grains, the more difficult it is for the crystalline Si to be amorphized during the lithiation process, resulting in a large resistance, which may lead to remaining lithium (Li) material, which may lead to severe deterioration of cycle performance and degree of swelling. On the other hand, due to the material characteristics of lithium transition metal compounds, the larger the size of the crystal grains, the more stable the crystal structure may be maintained even if the lithiation/delithiation process is repeated, thus maintaining a stable lithium diffusion path.

The present inventors have found that the above-described cycle performance deterioration and degree of swelling may be reduced by regulating the size of the crystal grains of the positive electrode active material within a specific range relative to the size of the Si crystal grains of the silicon carbon composite.

Specifically, when the crystal grains of the positive electrode active material are larger than the size of the Si crystal grains of the silicon carbon composite within the above-described range, a relatively stable crystal structure is maintained during the lithiation/delithiation process, so that the lithium diffusion pathway may be kept stable, and relative capacity reduction and swelling may be prevented because electrochemical reactions occur easily even with a small amount of lithium (Li). Further, when the size of the Si crystal grains of the silicon carbon composite satisfies the above-described range, the stress caused by the volume expansion of the negative electrode active material particles during charging and discharging may be reduced, so that cycle characteristics and swelling performance may be improved because cracking of the particles may be prevented.

By regulating the crystal grain sizes of the lithium transition metal compound and the Si crystal grains of the negative electrode active material, the cycle performance and swelling which are caused by residual lithium can be reduced by a relatively stable crystal structure of the positive active material. Therefore, the rapid charging performance, efficiency, service life and/or energy density of a lithium secondary battery designed within a limited space can be easily improved by regulating the crystal grains of the lithium transition metal compound and the Si crystal grains of the negative electrode active material.

In an exemplary embodiment of the present disclosure, the silicon carbon composite may be a Si/C-based active material.

In the present specification, the silicon carbon composite is a composite of Si and C, and and Si and C (e.g., graphite) exist separately. For example, each of Si and C peaks can be observed by elemental analysis methods such as XRD, NMR and the like.

In the present disclosure, the silicon carbon composite may be denoted as Si/C. The silicon carbon composite may consist of Si and C that are not bonded to each other, but may contain additional components as needed. For example, the silicon carbon composite may or may not include silicon carbide, denoted as SiC. When the silicon carbon composite contains silicon carbide, the content of which is 3% by weight or less. The silicon carbon composite may exist in a crystalline state, amorphous state, or a mixture thereof. According to one embodiment, C in the silicon carbon composite may exist in an amorphous state.

The silicon carbon composite may be a composite of silicon, carbon, and the like, and may also form a structure in which a core made of a composition of silicon, carbon and the like is surrounded by graphite, graphene, amorphous carbon and the like. In the silicon carbon composite, the silicon may be nano-silicon.

The silicon carbon composite may be a physical or chemical composite of the carbon and the silicon material, and is not limited as long as it is a composition in which the carbon and silicon material form a composite.

Specifically, the silicon carbon composite may form a composition in which carbon is heat-treated (firing) in a state of being bonded to silicon or silicon oxide particles to coat the surface of the particles with the carbon material, or a composition in which carbon is dispersed in an atomic state inside silicon particles, or a structure in which a core made of a composition of silicon, carbon and the like is surrounded by graphite, graphene, amorphous carbon and the like.

In an exemplary embodiment of the present disclosure, the silicon carbon composite may have an average particle diameter ($D_{50}$) of 1 μm or more. In addition, the silicon carbon composite may have an average particle diameter ($D_{50}$) of 15 μm or less. For example, the silicon carbon composite may have an average particle diameter ($D_{50}$) of 1 μm or more and 15 μm less, more than 1 μm and less than 15 μm, 2 μm or more and 14 μm or less, 3 μm or more and 13 μm or less, 3 μm to 10 μm, 4 μm to 8 μm or 5 μm to 8 μm.

Even though the silicon carbon composite is formed with a small particle diameter having an average particle diameter ($D_{50}$) of 1 μm or more and 15 μm or less, the service life characteristics of the battery may be improved. For example, when the average particle diameter ($D_{50}$) of the silicon carbon composite is 1 μm or more and 15 μm or less, volume expansion and contraction rate according to charging and discharging may be reduced to improve the service life performance. In addition, the specific surface area is prevented from excessively increasing to prevent side reactions with the electrolytic solution due to progress of the cycle, so that the service life performance may be improved.

In an exemplary embodiment of the present disclosure, the negative electrode active material may further include graphite.

The graphite may be natural graphite or artificial graphite, or a mixture of natural graphite and artificial graphite.

When the graphite is a mixture of natural graphite and artificial graphite, the weight ratio of natural graphite and artificial graphite may be 50:50 to 90:10, specifically 60:40 to 80:20 or 65:35 to 75:25.

In an exemplary embodiment of the present disclosure, the graphite may have an average particle diameter ($D_{50}$) of 10 μm to 20 μm. Specifically, the average particle diameter may be 15 μm to 20 μm. When the average particle diameter of graphite satisfies the above range, the influence by the aggregation of particles is reduced and slurry dispersibility may be improved.

In an exemplary embodiment of the present disclosure, the positive electrode active material may include a lithium transition metal compound including nickel (Ni), cobalt (Co) and manganese (Mn).

In an exemplary embodiment of the present disclosure, the positive electrode active material includes the nickel, cobalt and manganese, and may further include aluminum.

In the present specification, the lithium transition metal compound includes 80 mol % or more and less than 100 mol % of nickel among the metals except for lithium, and the lithium transition metal compound may include one or a mixture of two or more represented by the following Chemical Formula 1.

[Chemical Formula 1]

$$Li_aNi_{1-b-c-d}Co_bMn_cQ_dO_{2+\delta}$$

In the chemical formula, Q is any one or more elements selected from the group consisting of Na, K, Mg, Ca, Sr, Ni, Co, Ti, Al, Si, Sn, Mn, Cr, Fe, V and Zr, $1 \leq a \leq 1.5$, $0 < b \leq 0.5$, $0 < c \leq 0.5$, $0 \leq d \leq 0.1$, $0 < b+c+d \leq 20$, and $-0.1 \leq \delta \leq 1.0$.

In the lithium transition metal compound of Chemical Formula 1, Li may be included in the content corresponding to a, that is, $1 \leq a \leq 1.5$. There is a concern in that when a is less than 1, the capacity may be reduced, and when a exceeds 1.5, the particles may be sintered in the firing process, making it difficult to prepare a positive electrode active material. Considering the effect of improving the capacity characteristics of the positive electrode active material by controlling the content of Li and the balance of sinterability during the preparation of the active material, Li may be included more preferably in a content of $1.1 \leq a \leq 1.2$.

Preferably, 1−(b+c+d) that is the content of Ni may be 0.88 In the lithium transition metal compound of Chemical Formula 1, Ni may be included in a content corresponding to 1−(b+c+d), for example, $0.8 \leq 1-(b+c+d) < 1$. When the content of Ni in the lithium transition metal compound of Chemical Formula 1 becomes a composition of 0.8 or more, a sufficient amount of Ni to contribute to charge/discharge may be secured to achieve a high capacity, preferably 0.9 or more, and more preferably 0.93 or more. Preferably, 1−(b+c+d) that is the content of Ni may be 0.99 or less, or 0.95 or less.

In the lithium transition metal compound of Chemical Formula 1, Co may be included in a content corresponding to b, that is, $0 < b \leq 0.5$. When the content of Co in the lithium transition metal compound of Chemical Formula 1 exceeds 0.5, there is a concern in that the cost is increased. Considering the remarkable effect of improving capacity characteristics due to including Co, Co may be more specifically included in a content of $0.03 \leq b \leq 0.2$.

In the lithium transition metal compound of Chemical Formula 1, Mn may be included in a content corresponding to c, that is, a content of $0 < c \leq 0.5$. There is a concern in that when c in the lithium transition metal compound of Chemical Formula 1 exceeds 0.5, the output characteristics and capacity characteristics of the battery may rather deteriorate, and the Mn may be included more specifically in a content of $0.01 \leq c \leq 0.2$.

In the lithium transition metal compound of Chemical Formula 1, Q may be a doping element included in the crystal structure of the lithium transition metal compound, and Q may be included in a content corresponding to d, that is, 0 d 0.1. Q may be one or two or more selected among Na, K, Mg, Ca, Sr, Ni, Co, Ti, Al, Si, Sn, Mn, Cr, Fe, V and Zr, and for example, Q may be Al.

In an exemplary embodiment of the present disclosure, the lithium transition metal compound may include a form of single particles.

In an exemplary embodiment of the present disclosure, the lithium transition metal compound may further include a form of secondary particles.

The single particles may be prepared by mixing a transition metal precursor and a lithium raw material and firing the resulting mixture. The secondary particles may be prepared by a different method than the single particles, and the composition thereof may be the same as or different from that of the single particles.

For example, the firing is performed at a temperature capable of forming single particles. In order to form the single particles, the firing needs to be performed at a temperature higher than that in the preparation of the secondary particles, and for example, when the composition of the precursor is the same, the firing needs to be performed at a temperature about 30° C. to 100° C. higher than that when the secondary particles are prepared. The firing temperature for forming the single particles may vary depending on the metal composition in the precursor, and for example, when a high-Ni NCM-based lithium transition metal compound having a nickel (Ni) content of 80 mol % or more is desired to be formed as a single particle, the firing temperature may be 700° C. to 1000° C., preferably approximately 800° C. to 950° C. When the firing temperature satisfies the above range, a positive electrode active material including single particles with excellent electrochemical properties may be prepared. When the firing temperature is less than 790° C., a positive electrode active material including a lithium transition metal compound in the form of secondary particles may be prepared, and when the firing temperature exceeds 950° C., the firing may occur excessively, so that a layered crystal structure may not be properly formed, thereby degrading the electrochemical properties.

In the present specification, the single particle is a term used to distinguish single particles from secondary particles formed by aggregation of more than 30 primary particles, more than 35 primary particles, more than 40 primary particles, more than 50 primary particles, more than 60 primary particles, more than 70 primary particles, more than 100 primary particles, more than 150 primary particles, or more than 200 primary particles in the related art, and is a concept including the form of a single particle composed of one primary particle and/or a pseudo-single particle which is an aggregate of 30 or less primary particles.

Specifically, in the present disclosure, the single particle may be in the form of a single particle composed of one primary particle and/or a pseudo-single particle which is an aggregate of 30 or less primary particles, and secondary particles may be in the form of aggregation of more than 30 primary particles, more than 35 primary particles, more than 40 primary particles, more than 50 primary particles, more than 60 primary particles, more than 70 primary particles, more than 100 primary particles, more than 150 primary particles, or more than 200 primary particles.

In the present specification, the size of the Si crystal grains included in the silicon carbon composite may be confirmed by X-ray diffraction analysis, and the X-ray diffraction analysis may be performed using an X-ray diffraction analysis (XRD) analyzer (trade name: D4-endavor, manufacturer: Bruker). Specifically, the XRD measurement may be performed by sampling a powder-type sample in a holder and using Cu K alpha X-rays. The size of the Si crystal grains may be calculated by fitting the XRD results using the Scherrer equation, and in this case, the size of the crystal grains may be measured based on Si(220). ($2\theta$=47.5° to 48.5°)

In an exemplary embodiment of the present disclosure, the silicon carbon composite may have a Si crystal grain size of 0.1 nm or more and 20 nm or less. Specifically, the Si crystal grain size may be 0.5 nm or more and 15 nm or less, 1 nm or more and 15 nm or less, 1.5 nm or more and 12 nm or less, 1.5 nm or more and 10 nm or less, 2 nm or more and 10 nm or less, 3 nm or more and 10 nm or less or 4 nm or more and 9 nm or less.

When the Si crystal grain size satisfies the above range, Li ions are uniformly diffused inside the Si particles, so that there is an effect of stably maintaining the structure of the Si particles during charging and discharging. Conversely, when the Si crystal grains exceed the above range, there is a problem in that cracks are formed in the particles by stress caused by the contraction/expansion of the Si material, which occurs during charging and discharging, and cell service life is shortened due to the accelerated deterioration of the material caused by reaction heterogeneity because Li ions fail to be diffused into the crystal grains.

In the present specification, the crystal grains of the lithium transition metal compound may mean, for example, the crystal size of the structure itself of the above-described Chemical Formula 1. In the present specification, the size of the crystal grains of the lithium transition metal compound may be confirmed by X-ray diffraction analysis, and the X-ray diffraction analysis may be performed using an X-ray diffraction analysis (XRD) analyzer (trade name: D4-endavor, manufacturer: Bruker). Specifically, the XRD measurement may be performed by sampling a powder-type sample in a holder and using Cu K alpha X-rays. The size of the crystal grains of the above lithium transition metal compound is calculated by fitting the XRD results using Scherr equation, and in this case, the size of the crystal grains may be measured based on the largest peak, which appears around $2\theta$=10° to 12°.

In an exemplary embodiment of the present disclosure, the lithium transition metal compound may have a crystal grain size of 100 nm or more and 200 nm or less. Specifically, the crystal grain size may be 100 nm or more and 170 nm or less, 100 nm or more and 160 nm or less or 105 nm or more and 150 nm or less.

When the crystal grain size of the lithium transition metal compound satisfies the above range, the lithium transition metal compound has excellent phase stability, and thus, may react stably with Li. Conversely, when the crystal grain size of the lithium transition metal compound is smaller than the above range, there is a problem in that a reaction with Li occurs for a long time of time, thereby reducing the efficiency of the positive electrode, and when the crystal grain size of the lithium transition metal compound exceeds the above range, there is a problem in that particle cracking of the positive electrode active material occurs in a rolling step during the process of manufacturing an electrode.

In an exemplary embodiment of the present disclosure, the size of the Si crystal grains of the silicon carbon composite may be 10% or less of the size of the crystal grains of the lithium transition metal compound. Specifically, the size of the Si crystal grains of the silicon carbon composite may be 0.5% or more and 10% or less, 1% or more and 10% or less or 1% or more and 9.5% or less of the size of the crystal grains of the lithium transition metal compound. When the size of the Si crystal grains of the silicon carbon composite and the size of the crystal grains of the lithium transition metal compound satisfy the above relationship, stress due to the volume expansion of the negative electrode active material particles during charging and discharging may be reduced, and thus, cracking of the particles may be prevented, and due to the stable crystal structure caused by the size of the crystal grains of a relatively large positive electrode active material, electrochemical reactions easily occur even with a small amount of lithium (Li), so that cycle characteristics and swelling performance may be improved.

Conversely, even though the size of the Si crystal grains of the silicon carbon composite and the size of the crystal grains of the lithium transition metal compound satisfy the above-described size of the crystal grains, when the size of the Si crystal grains of the silicon carbon composite exceeds 10% of the size of the crystal grains of the lithium transition metal compound, there is a problem in that the deterioration in cycle performance and the degree of swelling may be exacerbated due to lithium (Li) remaining in the silicon carbon composite, and cracks occur in the particles to lead to the deterioration in cycle performance due to the increase in internal stress of Si according to charging and discharging.

In an exemplary embodiment of the present disclosure, the single particles may have an average particle diameter ($D_{50}$) of 1 μm or more. In addition, the single particles may have an average particle diameter of 12 μm or less. For example, the single particles may have an average particle diameter ($D_{50}$) of about 1 μm or more and 12 μm or less, 1 μm or more and 8 μm or less, 1 μm or more and 6 μm or less, more than 1 μm and 6 μm or less, 2 μm or more and 6 μm or less, or 3 μm or more and 5 μm or less.

Even though the single particles are formed of small particle diameters having an average particle diameter ($D_{50}$) of 1 μm or more and 12 μm or less, the single particles may have excellent particle strength, and the excellent particle strength may alleviate a phenomenon in which the number of particulates in the electrode due to cracking of the particles is increased, thereby improving the service life characteristics of the battery. For example, the single particles may have a particle strength of 100 to 300 MPa when rolled with a force of 650 kgf/cm$^2$. As a result, even though the single particles are rolled with a strong force of 650 kgf/cm$^2$, a phenomenon in which the number of particulates in the electrode due to cracking of the particles is increased is alleviated, thereby improving the service life characteristics of the battery.

The method of forming the single particles is not particularly limited, but in general, single particles may be formed by increasing the firing temperature to achieve overfiring, and single particles may be prepared by a method of using an additive such as a grain growth promoter that helps overfiring or changing a starting material, and the like.

The single particles have high rigidity of the particles themselves, and thus are relatively excellent in deterioration of battery performance even when the electrode density is high. Therefore, the energy density may be increased by regulating the average particle diameter range of the single particles and the silicon carbon composite.

In an exemplary embodiment of the present disclosure, the average particle diameter ($D_{50}$) of the single particles may be smaller than the average particle diameter ($D_{50}$) of the silicon carbon composite.

When the average particle diameter of the single particles is smaller than the average particle diameter of the silicon carbon composite, the diffusion resistance of the single particles may be relatively decreased to improve the service life performance. That is, as the larger the average particle diameter of the single particles is increased, the diffusion resistance may be increased, and when the average particle diameter of the single particles is larger than the average particle diameter of the silicon carbon composite, due to the relative increase in the diffusion resistance, lithium precipitation and the like may occur, resulting in deterioration of battery performance and deterioration in service life performance.

When the average particle diameter of the single particles is smaller than the average particle diameter of the silicon carbon composite, it is possible to prevent the occurrence of side reactions with the electrolytic solution due to an increase in the specific surface area, thereby improving the service life performance.

According to an exemplary embodiment of the present disclosure, the average particle diameter ($D_{50}$) of the single particles may be 1 μm to 12 μm smaller than the average particle diameter ($D_{50}$) of the silicon carbon composite. Specifically, the average particle diameter of the single particles may be 1.5 μm to 11.5 μm, or 2 μm to 11 μm smaller than the average particle diameter of the silicon carbon composite.

When the average particle diameter ($D_{50}$) of the single particles is smaller than the average particle diameter ($D_{50}$) of the silicon carbon composite, for example, when the above range is satisfied, the diffusion resistance of the single particles may be relatively decreased to improve the service life performance. That is, as the average particle diameter of the single particles is increased, the diffusion resistance may be increased, and when the average particle diameter of the single particles is larger than the average particle diameter of the silicon carbon composite, due to the relative increase in the diffusion resistance, lithium precipitation and the like may occur, resulting in deterioration of battery performance and deterioration in service life performance.

When the average particle diameter ($D_{50}$) of the single particles is smaller than the average particle diameter ($D_{50}$) of the silicon carbon composite, for example, when the above range is satisfied, it is possible to prevent the occurrence of side reactions with the electrolytic solution due to an increase in the specific surface area, thereby improving the service life performance.

According to an exemplary embodiment of the present disclosure, the ratio of the average particle diameter ($D_{50}$) of the single particles to the average particle diameter ($D_{50}$) of the silicon carbon composite is 1.5:2 to 1.5:20.

When the above range is satisfied, the diffusion resistance of the single particles may be relatively decreased to improve the service life performance. That is, as the average particle diameter of the single particles is increased, the diffusion resistance may be increased, and when the average particle diameter of the single particles is larger than the average particle diameter of the silicon carbon composite, due to the relative increase in the diffusion resistance, lithium precipitation and the like may occur, resulting in deterioration of battery performance and deterioration in service life performance.

When the average particle diameter ($D_{50}$) of the single particles is smaller than the average particle diameter ($D_{50}$) of the silicon carbon composite, for example, when the above range is satisfied, it is possible to prevent the occurrence of side reactions with the electrolytic solution due to an increase in the specific surface area, thereby improving the service life performance.

In an exemplary embodiment of the present disclosure, the lithium transition metal compound further includes secondary particles, and the average particle diameter ($D_{50}$) of the single particles is smaller than the average particle diameter ($D_{50}$) of the secondary particles.

In the present disclosure, the single particle may be in the form of a single particle composed of one primary particle or a pseudo-single particle which is an aggregate of 30 or less primary particles, and secondary particles may be in the form of aggregation of more than 30 primary particles, more than 35 primary particles, more than 40 primary particles, more than 50 primary particles, more than 60 primary particles, more than 70 primary particles, more than 100 primary particles, more than 150 primary particles, or more than 200 primary particles.

The above-described lithium transition metal compound may further include secondary particles. A secondary particle refers to a form formed by aggregation of primary particles, and may be distinguished from the concept of a single particle including the form of one primary particle, one single particle or a pseudo-single particle which is an aggregate of 30 or less primary particles.

The secondary particles may have an average particle diameter ($D_{50}$) of 1 μm to 20 μm. Specifically, the secondary particles may have an average particle diameter of 2 μm to 17 μm, 3 μm to 15 μm, 5 μm to 15 μm, 7 μm to 15 μm, or 9 μm to 15 μm.

In an exemplary embodiment of the present disclosure, the secondary particle is an aggregate of primary particles, and the primary particles have an average particle diameter ($D_{50}$) of 0.5 μm to 3 μm. Specifically, the secondary particle may be in the form of aggregation of more than 30 primary particles, and the primary particles may have an average particle diameter of 0.6 μm to 2.8 μm, 0.8 μm to 2.5 μm, or 0.8 μm to 1.5 μm.

When the average particle diameter of the primary particles satisfies the above range, a single particle positive electrode active material with excellent electrochemical properties may be formed. When the average particle diameter of the primary particles is too small, the number of aggregated primary particles forming the lithium-nickel-based oxide particles increases, so the effect of suppressing the occurrence of particle cracking during rolling is reduced, and when the average particle diameter of the primary particles is too large, the lithium diffusion path inside the primary particles becomes long, so the resistance increases and the output characteristics may deteriorate.

In an exemplary embodiment of the present disclosure, the average particle diameter ($D_{50}$) of the single particles may be smaller than the average particle diameter ($D_{50}$) of the secondary particles. Therefore, even though the single particles are formed with small particle diameters, the single particles may have excellent particle strength, and the excellent particle strength may alleviate a phenomenon in which the number of particulates in the electrode due to cracking of the particles is increased, thereby improving the service life characteristics of the battery.

In an exemplary embodiment of the present disclosure, the average particle diameter ($D_{50}$) of the single particles is 1 μm to 18 μm smaller than the average particle diameter ($D_{50}$) of the secondary particles.

For example, the average particle diameter of the single particles may be 1 μm to 16 μm smaller, 1.5 μm to 15 μm smaller, or 2 μm to 14 μm smaller than the average particle diameter of the secondary particles.

When the average particle diameter of the single particles is smaller than the average particle diameter of the secondary particles, for example, when the above range is satisfied, the single particles may have excellent particle strength even though formed with a small particle diameter, and thus, the excellent particle strength alleviates a phenomenon in which the number of particulates in the electrode due to cracking of the particles is increased, thereby having an effect of improving the service life characteristics of the battery and improving the energy density.

In an exemplary embodiment of the present disclosure, the average particle diameter ($D_{50}$) of the silicon carbon composite may be smaller than the average particle diameter ($D_{50}$) of the graphite. When the average particle diameter of the silicon carbon composite is smaller than the average particle diameter of the graphite, particle cracking is reduced due to the decrease in volume expansion/contraction rate during charging and discharging, so there is an effect of improving the service life performance of the battery.

In the lithium secondary battery according to the above-described exemplary embodiments, the negative electrode active material may further include a carbon-based active material. Specifically, the carbon-based active material may be graphite. The graphite may be natural graphite, artificial graphite or a mixture thereof.

According to an exemplary embodiment of the present disclosure, the average particle diameter ($D_{50}$) of the silicon-carbon composite may be 1 μm to 25 μm smaller than the average particle diameter ($D_{50}$) of the graphite. For example, the average particle diameter of the silicon carbon composite may be 2 μm to 24 μm smaller, 3 μm to 23 μm smaller, or 4 μm to 22 μm smaller than the average particle diameter of the graphite.

When the average particle diameter of the silicon carbon composite is smaller than the average particle diameter of the graphite, for example, when the above range is satisfied, there is an effect of further improving the service life performance of the battery.

In an exemplary embodiment of the present disclosure, the average particle diameters ($D_{50}$) of the secondary particles, when the single particles, the graphite and the silicon carbon composite are A, B, C and D, respectively, A, B, C, and D may satisfy the relationship of $B<D\leq A<C$.

The exemplary embodiments of the secondary particles, the single particles, the graphite, and the silicon carbon composite are as described above.

When the average particle diameters ($D_{50}$) of the secondary particles, the single particles, the graphite, and the silicon carbon composite are A, B, C, and D, respectively, the case where $B<D\leq A<C$ has an effect of improving the service life performance of the battery.

According to an exemplary embodiment of the present application, the negative electrode active material further includes graphite, and when the average particle diameters ($D_{50}$) of the single particles, the graphite and the silicon carbon composite are B, C and D, respectively, B, C, and D may satisfy the relationship of $B<D<C$.

When the average particle diameters ($D_{50}$) of the secondary particles, the single particles and the silicon carbon composite are A, B and D, respectively, A, B, and D may satisfy the relationship of $B<D\leq A$.

When the average particle diameters ($D_{50}$) of the secondary particles, the single particles and the graphite are A, B and C, respectively, A, B, and C may satisfy the relationship of $B<A<C$.

The average particle diameters ($D_{50}$) of the secondary particles, the graphite and the silicon carbon composite are A, C and D, respectively, A, C, and D may satisfy the relationship of $D\leq A<C$.

When the above ranges are satisfied, there is an effect of improving the service life performance of the battery.

In an exemplary embodiment of the present disclosure, in the lithium secondary battery according to the above-described exemplary embodiments, the single particles are included in an amount of 15 parts by weight to 100 parts by weight with respect to 100 parts by weight of the positive electrode active material, and the silicon carbon composite is included in an amount of 3 parts by weight to 30 parts by weight with respect to 100 parts by weight of the negative electrode active material.

In an exemplary embodiment of the present disclosure, the single particles are included in an amount of 15 parts by weight to 100 parts by weight with respect to 100 parts by weight of the positive electrode active material. The single particles may be included in an amount of 20 parts by weight to 100 parts by weight, or 30 parts by weight to 100 parts by weight with respect to 100 parts by weight of the positive electrode active material.

For example, the single particles may be included in an amount of 15 parts by weight or more, 20 parts by weight or more, 25 parts by weight or more, 30 parts by weight or more, 35 parts by weight or more, 40 parts by weight or more, or 45 parts by weight or more with respect to 100 parts by weight of the positive electrode active material. For example, the single particles may be included in an amount of 100 parts by weight or less, 90 parts by weight or less, 80 parts by weight or less, 70 parts by weight or less or 60 parts by weight or less with respect to 100 parts by weight of the positive electrode active material.

When the single particles within the above range are included, excellent battery characteristics may be exhibited in combination with the above-described negative electrode material. In particular, when the amount of the single particles is 15 parts by weight or more, a phenomenon in which the number of particulates in the electrode due to particle cracking during the rolling process after manufacturing the electrode is increased may be alleviated, thereby improving the service life characteristics of the battery.

In an exemplary embodiment of the present disclosure, the lithium transition metal compound may further include secondary particles, and the amount of the secondary particles may be 85 parts by weight or less with respect to 100 parts by weight of the positive electrode active material. The amount of the secondary particles may be 80 parts by weight or less, 75 parts by weight or less, 70 parts by weight, or 60 parts by weight or less with respect to 100 parts by weight of the positive electrode active material. The amount of the secondary particles may be 10 parts by weight or more, 20 parts by weight or more, 30 parts by weight or more, or 40 parts by weight or more with respect to 100 parts by weight of the positive electrode active material.

In an exemplary embodiment of the present disclosure, a weight ratio of the single particles and the secondary particles may be 1:9 to 9:1, 2:8 to 8:2, 3:7 to 7:3, or 4:6 to 6:4.

When the above range is satisfied, the above-described effect due to the presence of the positive electrode active material of single particles may be maximized. When the positive electrode active material of the secondary particles is included, the components may be the same as those exemplified as the above-described single particle positive electrode active material, may be different components, and may mean a form of aggregation of single particle forms.

In an exemplary embodiment of the present disclosure, the positive electrode active material in 100 parts by weight of the positive electrode active material layer may be included in an amount of 80 parts by weight or more and 99.9 parts by weight or less, preferably 90 parts by weight or more and 99.9 parts by weight or less, more preferably 95 parts by weight or more and 99.9 parts by weight or less, and even more preferably 98 parts by weight or more and 99.9 parts by weight or less.

According to an exemplary embodiment of the present disclosure, the positive electrode according to the above-described exemplary embodiments further includes a positive electrode binder and a conductive material.

The positive electrode binder serves to improve the bonding between positive electrode active material particles and the adhesion between the positive electrode active material particles and the positive electrode current collector. As the positive electrode binder, those known in the art may be used, non-limiting examples thereof include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The positive electrode binder may be included in an amount of 0.1 parts by weight or more and 50 parts by weight or less, for example, preferably 0.3 parts by weight or more and 35 parts by weight or less, and more preferably 0.5 parts by weight or more and 20 parts by weight or less, based on 100 parts by weight of the positive electrode active material layer.

The conductive material included in the positive electrode active material layer is used to impart conductivity to the electrode, and can be used without particular limitation as long as the conductive material has electron conductivity without causing a chemical change in a battery. Specific examples thereof include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as zinc oxide and potassium titanate; a conductive metal oxide such as titanium oxide; or a conductive polymer such as a polyphenylene derivative, and any one thereof or a mixture of two or more thereof may be used.

Specifically, in an exemplary embodiment, the conductive material may include one or more of single-walled carbon nanotube (SWCNT); and multi-walled carbon nanotube (MWCNT). The conductive material may be included in an amount of 0.1 parts by weight or more and 2 parts by weight or less, for example, preferably 0.3 parts by weight or more and 1.5 parts by weight or less, and more preferably 0.5 parts by weight or more and 1.2 parts by weight or less, based on 100 parts by weight of the composition for a positive electrode active material layer.

In the present specification, the silicon carbon composite is a composite of Si and C, Si and C (e.g., graphite) peaks are observed in the XRD diffraction pattern, and the second phase Si/C may not be formed. According to the above-described exemplary embodiment of the present disclosure, the negative electrode active material layer includes a silicon carbon composite in an amount of 3 parts by weight to 30 parts by weight based on 100 parts by weight of the entire negative electrode active material. According to an example, the negative electrode active material layer may include a silicon carbon composite in an amount of 3 parts by weight to 20 parts by weight, or 3 parts by weight to 13 parts by weight, preferably 5 parts by weight to 10 parts by weight, based on 100 parts by weight of the entire negative electrode active material. By using the silicon carbon composite within the range described above, excellent battery characteristics may be exhibited in combination with the above-described positive electrode material. In particular, when the silicon carbon composite is included in an amount of 3 parts by weight or more, the effect according to using the silicon carbon composite may be sufficiently exhibited. In addition, since the silicon carbon composite has a higher capacity than the SiOx-based active material, it may be difficult to balance the capacity with the positive electrode active material when used in an excessive amount, and in particular, when the silicon carbon composite is included in an amount of 30 parts by weight or less, expansion during charging and discharging may be prevented to improve cycle characteristics.

The silicon carbon composite is a material with higher capacity and higher efficiency than silicon-based oxides, and even when a conductive material is not included, it is possible to show an excellent effect in terms of resistance compared to a negative electrode including silicon-based oxide and a conductive material. In addition, since the silicon carbon composite exhibits higher Si crystallinity than silicon-based oxides, it is possible to exhibit an excellent effect during high output evaluation.

In an exemplary embodiment of the present disclosure, in the lithium secondary battery according to the above-described exemplary embodiments, the negative electrode active material may further include a carbon-based active material. Specifically, the carbon-based active material may be graphite. The graphite may be natural graphite, artificial graphite or a mixture thereof. Based on 100 parts by weight of the entire negative electrode active material included in the negative electrode active material layer, the graphite may be included in an amount of 70 parts by weight or more and 97 parts by weight or less.

Based on 100 parts by weight of the entire negative electrode active material, the graphite may be included in an amount of 75 parts by weight or more, 80 parts by weight or more, or 85 parts by weight or more. Based on 100 parts by weight of the entire negative electrode active material, the graphite may be included in an amount of 95 parts by weight or less, 93 parts by weight or less, or 90 parts by weight or less. When the graphite is a mixture of artificial graphite and natural graphite, the artificial graphite and natural graphite may be included at a weight ratio of 90:10 parts by weight to 50:50 parts by weight, 85:15 parts by weight to 60:40 parts by weight, or 80:20 parts by weight to 65:35 parts by weight based on 100 parts by weight of the graphite.

In an exemplary embodiment of the present disclosure, the weight ratio of the carbon-based active material and the silicon carbon composite may be 0.1:99.9 to 30:70, 1:99 to 20:80, 5:95 to 20:80, 5:95 to 15:85, 8:92 to 12:88 or 10:90 to 12:88.

In an exemplary embodiment of the present disclosure, the negative electrode active material in 100 parts by weight of the negative electrode active material layer may be included in an amount of 80 parts by weight or more and 99.9 parts by weight or less, preferably 90 parts by weight or more and 99.9 parts by weight or less, more preferably 95 parts by weight or more and 99.9 parts by weight or less, and even more preferably 98 parts by weight or more and 99.9 parts by weight or less.

In an exemplary embodiment of the present disclosure, in the lithium secondary battery according to the above-described exemplary embodiments, the negative electrode active material layer may further include a negative electrode binder in addition to a silicon carbon composite and graphite.

The negative electrode binder serves to improve the bonding between negative electrode active material particles and the adhesion between the negative electrode active material particles and the negative electrode current collector. As the negative electrode binder, those known in the art may be used, and non-limiting examples thereof may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene butadiene rubber (SBR), fluorine rubber, polyacrylic acid and a material in which the hydrogen thereof is substituted with Li, Na, Ca, or the like, and may also include various copolymers thereof.

The negative electrode binder may be included in an amount of 0.1 parts by weight or more and 50 parts by weight or less, for example, preferably 0.3 parts by weight or more and 35 parts by weight or less, and more preferably 0.5 parts by weight or more and 10 parts by weight or less, based on 100 parts by weight of the negative electrode active material layer.

The negative electrode active material layer may not include a conductive material, but may further include a conductive material, if necessary. The conductive material included in the negative electrode active material layer is not particularly limited as long as the conductive material has conductivity without causing a chemical change to the battery, and for example, it is possible to use graphite such as natural graphite or artificial graphite; carbon black such as acetylene black, Ketjen black, channel black, furnace black, lamp black, and thermal black; a conductive fiber such as carbon fiber or metal fiber; a conductive tube such as a carbon nanotube; a metal powder such as a carbon fluoride powder, an aluminum powder, and a nickel powder; a conductive whisker such as zinc oxide and potassium titanate; a conductive metal oxide such as titanium oxide; a conductive material such as polyphenylene derivatives, and the like. The content of the conductive material in the negative electrode active material layer may be 0.01 parts by weight to 30 parts by weight, preferably 0.03 parts by weight to 25 parts by weight, with respect to 100 parts by weight of the negative electrode active material layer.

In an exemplary embodiment of the present disclosure, the positive electrode includes a positive electrode current collector and a positive electrode active material layer formed on the positive electrode current collector and including the positive electrode active material.

The positive electrode current collector is not particularly limited as long as the collector has conductivity without causing a chemical change to a battery, and for example, it is possible to use stainless steel, aluminum, nickel, titanium, calcined carbon, or aluminum or stainless steel whose surface is treated with carbon, nickel, titanium, silver, and the like. Further, the positive electrode current collector may typically have a thickness of 1 to 500 μm, and the adhesion of the positive electrode active material may also be enhanced by forming fine irregularities on the surface of the current collector. For example, the positive electrode current collector may be used in various forms such as a film, a sheet, a foil, a net, a porous body, a foam body, and a non-woven fabric body.

In an exemplary embodiment of the present disclosure, the negative electrode includes a negative electrode current collector and a negative electrode active material layer formed on the negative electrode current collector and including the negative electrode active material.

The negative electrode current collector is sufficient as long as the negative electrode current collector has conductivity without causing a chemical change to the battery, and is not particularly limited. For example, as the current collector, it is possible to use copper, stainless steel, aluminum, nickel, titanium, fired carbon, or aluminum or stainless steel whose surface is treated with carbon, nickel, titanium, silver, and the like. Specifically, a transition metal, such as copper or nickel which adsorbs carbon well, may be used as a current collector. Although the current collector may have a thickness of 1 μm to 500 μm, the thickness of the current collector is not limited thereto.

In an exemplary embodiment of the present disclosure, the positive electrode further includes a positive electrode active material layer including the positive electrode active material, the negative electrode further includes a negative electrode active material layer including the negative electrode active material, and the thicknesses of the positive electrode and negative electrode active material layers are each 10 μm or more and 500 μm or less. The thickness of the positive electrode active material layer may be 90% to 110%, for example, 95% to 105% of the thickness of the negative electrode active material layer, and the thicknesses of the active material layers may be the same. Specifically, the positive electrode and negative electrode active material layers may each have a thickness of 15 μm or more and 400 μm or less, 20 μm or more and 300 μm or less, 25 μm or more and 200 μm or less, or 30 μm or more and 100 μm or less.

In an exemplary embodiment of the present disclosure, the positive electrode further includes a positive electrode active material layer including the positive electrode active material, a loading amount per unit volume of the positive electrode active material layer is 250 mg/25 $cm^2$ to 900 mg/25 $cm^2$, the negative electrode further includes a negative electrode active material layer including the negative electrode active material, and a loading amount per unit volume of the negative electrode active material layer is 100 mg/25 $cm^2$ to 600 mg/25 $cm^2$. Specifically, a loading amount per unit volume of the positive electrode active material layer may be 270 mg/25 $cm^2$ to 800 mg/25 $cm^2$, 285 mg/25 $cm^2$ to 700 mg/25 $cm^2$, or 300 mg/25 $cm^2$ to 600 mg/25 $cm^2$, and a loading amount per unit volume of the negative electrode active material layer may be 120 mg/25 $cm^2$ to 500 mg/25 $cm^2$, 135 mg/25 $cm^2$ to 400 mg/25 $cm^2$, or 150 mg/25 $cm^2$ to 300 mg/25 $cm^2$.

The positive electrode and the negative electrode may be manufactured by a method for manufacturing a positive electrode and a negative electrode in the related art, except that the aforementioned positive electrode and negative electrode active materials are used. Specifically, after a composition for forming an active material layer, which includes the aforementioned active material and, optionally, a binder and a conductive material is applied onto current collectors, the positive electrode and negative electrode may be manufactured by drying and rolling the current collectors. In this case, the types and contents of the positive and negative electrode active materials, binders, and conductive materials are as described above. The solvent may be a solvent commonly used in the art, examples thereof include dimethyl sulfoxide (DMSO), isopropyl alcohol, N-methylpyrrolidone (NMP), acetone, water, or the like, and among them, any one thereof or a mixture of two or more thereof may be used. The amount of solvent used is sufficient as long as the solvent in the amount dissolves or disperses the active material, conductive material and binder in consideration of the application thickness and preparation yield of the slurry, and has a viscosity capable of exhibiting excellent thickness uniformity during subsequent application for manufacturing the positive electrode and the negative electrode. Alternatively, by another method, the positive electrode and the negative electrode may be manufactured by casting the composition for forming an active material layer on a separate support and then laminating a film obtained by performing peel-off from the support on a current collector.

The separator separates the negative electrode and the positive electrode and provides a passage for movement of lithium ions, and can be used without particular limitation as long as the separator is typically used as a separator in a secondary battery, and in particular, a separator having an excellent ability to retain moisture of an electrolytic solution as well as low resistance to ion movement in the electrolyte is preferable. Specifically, it is possible to use a porous polymer film, for example, a porous polymer film formed of a polyolefin-based polymer such as an ethylene homopolymer, a propylene homopolymer, an ethylene/butene copolymer, an ethylene/hexene copolymer, and an ethylene/methacrylate copolymer, or a laminated structure of two or more layers thereof. In addition, a typical porous non-woven fabric, for example, a non-woven fabric made of a glass fiber having a high melting point, a polyethylene terephthalate fiber, and the like may also be used. Furthermore, a coated separator including a ceramic component or a polymeric material may be used to secure heat resistance or mechanical strength and may be selectively used as a single-layered or multi-layered structure.

Examples of the electrolyte include an organic liquid electrolyte, an inorganic liquid electrolyte, a solid polymer electrolyte, a gel-type polymer electrolyte, a solid inorganic electrolyte, a molten-type inorganic electrolyte, and the like, which can be used in the preparation of a lithium secondary battery, but are not limited thereto.

Specifically, the electrolyte may include a non-aqueous organic solvent and a metal salt.

As the non-aqueous organic solvent, it is possible to use, for example, an aprotic organic solvent, such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, among the carbonate-based organic solvents, cyclic carbonates ethylene carbonate and propylene carbonate may be preferably used because the cyclic carbonates have high permittivity as organic solvents of a high viscosity and thus dissociate a lithium salt well, and such cyclic carbonates may be more preferably used since the cyclic carbonate may be mixed with a linear carbonate of a low viscosity and low permittivity such as dimethyl carbonate and diethyl carbonate in an appropriate ratio and used to prepare an electrolyte having a high electric conductivity.

As the metal salt, a lithium salt may be used, the lithium salt is a material which is easily dissolved in the non-aqueous electrolyte solution, and for example, as an anion of the lithium salt, it is possible to use one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In the electrolyte, for the purpose of improving the service life characteristics of a battery, suppressing the decrease in battery capacity, and improving the discharge capacity of the battery, one or more additives, such as, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be further included in addition to the above electrolyte constituent components.

The lithium secondary battery according to an exemplary embodiment of the present disclosure has an energy density of 400 Wh/L to 900 Wh/L. Specifically, the lithium secondary battery may have an energy density of 425 Wh/L to 875 Wh/L, 450 Wh/L to 850 Wh/L, 475 Wh/L to 825 Wh/L, or 500 Wh/L to 800 Wh/L. When the above range is satisfied, the energy density of a lithium secondary battery designed in a limited space may be increased, the high output performance thereof may be improved, and the battery cycle performance may also be improved.

A lithium secondary battery according to an exemplary embodiment of the present disclosure may be a cylindrical battery. The cylindrical battery means that the form of the battery itself, which includes an assembly including a positive electrode, a negative electrode, a separator and an electrolyte, is cylindrical, and specifically, may be composed of a cylindrical can, a battery assembly provided inside the cylindrical can, and a top cap. However, the lithium secondary battery is not limited thereto, and may be a prismatic battery or a pouch-type battery.

An exemplary embodiment of the present disclosure provides a battery pack including the above-described cylindrical battery as a unit cell and an electronic device including the same. The battery pack and the electronic device include the secondary battery which has high capacity, high rate properties, and cycle properties, and thus, may be used as a power source of a medium-and-large sized device selected from the group consisting of an electric vehicle, a hybrid electric vehicle, a plug-in hybrid electric vehicle, and a power storage system.

Since the lithium secondary battery according to exemplary embodiments of the present disclosure stably exhibits excellent discharge capacity, output characteristics, and cycle performance, the lithium secondary battery may be used as a power source for electronic devices including portable devices, such as mobile phones, notebook-sized computers and digital cameras, and medium-and-large sized devices selected from the group consisting of electric vehicles, hybrid electric vehicles, plug-in hybrid electric vehicles, and power storage systems. For example, the battery module or battery pack may be used as a power source for one or more medium-and-large sized devices of a power tool; an electric vehicle including an electric vehicle (EV), a hybrid electric vehicle and a plug-in hybrid electric vehicle (PHEV); and a power storage system.

Hereinafter, preferred embodiments will be suggested to facilitate understanding of the present disclosure, but the embodiments are only provided to illustrate the present disclosure, and it is apparent to those skilled in the art that various alterations and modifications are possible within the scope and technical spirit of the present disclosure, and it is natural that such alterations and modifications also fall within the accompanying claims.

EXAMPLES AND COMPARATIVE EXAMPLES

Example 1

A composition for forming a positive electrode active material layer, including 98.04 parts by weight (single particles:secondary particles=50:50 weight ratio) of a lithium transition metal compound having contents of 93.3 mol % of Ni, 4.9 mol % of Co and 1.8 mol % of Mn among metals except for lithium as a positive electrode active material, and including single particles and secondary particles, 1 part by weight of PVDF as a binder, and a CNT pre-dispersion including 0.8 parts by weight of CNT as a conductive material and 0.16 parts by weight of a dispersing agent based on 100 parts by weight of a positive electrode active material layer, was prepared.

The lithium transition metal compound was heat treated at 750° C. for 8 hours under Ar atmosphere, and the crystal grain size of the lithium transition metal compound used was 110 nm. By an airflow pulverization method, the single particles were prepared with a size of $D_{50}$=3.57 μm, and the secondary particles were prepared with a size of $D_{50}$=9.5 μm. An aluminum foil having a thickness of 30 μm was coated with the composition for forming a positive electrode active material layer so as to have a thickness of 103 μm in a dry state, and then dried to manufacture a positive electrode.

A composition for forming a negative electrode active material layer, including 97.7 parts by weight of graphite (containing artificial graphite and natural graphite having a weight ratio of 70:30, and being present in an amount of 90 parts by weight based on 100 parts by weight of the negative electrode active material) and a silicon carbon composite (10 parts by weight based on 100 parts by weight of the negative electrode active material) as a negative electrode active material, 1.15 parts by weight of styrene-butadiene rubber (SBR) as a binder and 1 part by weight of carboxymethyl cellulose (CMC) and further including a CNT pre-dispersion including 0.09 parts by weight of a dispersing agent and 0.06 parts by weight of a single-walled CNT, based on 100 parts by weight of the negative electrode active material layer, was prepared.

The silicon carbon composite was heat treated at 300° C. for 2 hours under Ar atmosphere, and the Si crystal grain size of the silicon carbon composite used was 6 nm. By an airflow pulverization method, the silicon carbon composite was prepared with a size of $D_{50}$=5.2 μm, and the graphite was prepared with a size of $D_{50}$=17 μm. A copper foil having a thickness of 15 μm was coated with the composition for forming a negative electrode active material layer so as to have a thickness of 86 μm in a dry state, and then dried to manufacture a negative electrode.

The positive electrode and negative electrode were stacked with a separator therebetween, and an electrolytic solution (1.0 $MLiPF_6$, ethylene carbonate (EC)/ethylmethyl carbonate (EMC)=30/70 (vol %), vinylene carbonate (VC) 1.5%) was injected to manufacture a battery.

Example 2

Lithium secondary battery was manufactured in the same manner as in Example 1, except that the lithium transition metal compound and the silicon carbon composite were prepared as described below.

The lithium transition metal compound used was heat treated at 750° C. for 8 hours under Ar atmosphere, and the crystal grain size of the lithium transition metal compound used was 120 nm. By an airflow pulverization method, the single particles were prepared with a size of $D_{50}$=3.58 μm, and the secondary particles were prepared with a size of $D_{50}$=14.7 μm.

The silicon carbon composite was heat treated at 200° C. for 2 hours under Ar atmosphere, and the Si crystal grain size of the silicon carbon composite used was 1.5 nm. By an airflow pulverization method, the silicon carbon composite was prepared with a size of $D_{50}$=6.2 μm, and the graphite was prepared with a size of $D_{50}$=17 μm.

Example 3

Lithium secondary battery was manufactured in the same manner as in Example 1, except that the lithium transition metal compound and the silicon carbon composite were prepared as described below.

The lithium transition metal compound used was heat treated at 750° C. for 8 hours under Ar atmosphere, and the crystal grain size of the lithium transition metal compound used was 105 nm. By an airflow pulverization method, the single particles were prepared with a size of $D_{50}$=3.63 μm, and the secondary particles were prepared with a size of $D_{50}$=10.5 μm.

The silicon carbon composite was heat treated at 400° C. for 2 hours under Ar atmosphere, and the Si crystal grain size of the silicon carbon composite used was 9 nm. By an airflow pulverization method, the silicon carbon composite was prepared with a size of $D_{50}$=7.1 μm, and the graphite was prepared with a size of $D_{50}$=17 μm.

Example 4

Lithium secondary battery was manufactured in the same manner as in Example 1, except that the lithium transition metal compound and the silicon carbon composite were prepared as described below.

The lithium transition metal compound used was heat treated at 800° C. for 10 hours under Ar atmosphere, and the crystal grain size of the lithium transition metal compound used was 150 nm. By an airflow pulverization method, the single particles were prepared with a size of $D_{50}$=3.72 μm, and the secondary particles were prepared with a size of $D_{50}$=9.5 μm.

The silicon carbon composite was heat treated at 300° C. for 2 hours under Ar atmosphere, and the Si crystal grain size of the silicon carbon composite used was 4 nm. By an airflow pulverization method, the silicon carbon composite was prepared with a size of $D_{50}$=6.3 μm, and the graphite was prepared with a size of $D_{50}$=17 μm.

Example 5

Lithium secondary battery was manufactured in the same manner as in Example 1, except that the lithium transition metal compound and the silicon carbon composite were prepared as described below.

The lithium transition metal compound used was heat treated at 750° C. for 8 hours under Ar atmosphere, and the crystal grain size of the lithium transition metal compound used was 110 nm. By an airflow pulverization method, the single particles were prepared with a size of $D_{50}$=3.57 μm, and the secondary particles were prepared with a size of $D_{50}$=9.5 μm.

The silicon carbon composite was heat treated at 400° C. for 2 hours under Ar atmosphere, and the Si crystal grain size of the silicon carbon composite used was 10 nm. By an airflow pulverization method, the silicon carbon composite was prepared with a size of $D_{50}$=6.9 μm, and the graphite was prepared with a size of $D_{50}$=17 μm.

Example 6

Lithium secondary battery was manufactured in the same manner as in Example 1, except that the lithium transition metal compound and the silicon carbon composite were prepared as described below.

The lithium transition metal compound used was heat treated at 800° C. for 10 hours under Ar atmosphere, and the crystal grain size of the lithium transition metal compound used was 140 nm. By an airflow pulverization method, the single particles were prepared with a size of $D_{50}$=3.74 μm, and the secondary particles were prepared with a size of $D_{50}$=16.5 μm.

The silicon carbon composite was heat treated at 500° C. for 2 hours under Ar atmosphere, and the Si crystal grain size of the silicon carbon composite used was 12 nm. By an airflow pulverization method, the silicon carbon composite was prepared with a size of $D_{50}$=7.0 μm, and the graphite was prepared with a size of $D_{50}$=17 μm.

Comparative Example 1

Lithium secondary battery was manufactured in the same manner as in Example 1, except that the lithium transition metal compound and the silicon carbon composite were prepared as described below.

The lithium transition metal compound used was heat treated at 750° C. for 8 hours under Ar atmosphere, and the crystal grain size of the lithium transition metal compound used was 110 nm. By an airflow pulverization method, the single particles were prepared with a size of $D_{50}$=3.63 μm, and the secondary particles were prepared with a size of $D_{50}$=9.6 μm.

The silicon carbon composite was heat treated at 500° C. for 2 hours under Ar atmosphere, and the Si crystal grain size of the silicon carbon composite used was 12 nm. By an airflow pulverization method, the silicon carbon composite was prepared with a size of $D_{50}$=7.0 μm, and the graphite was prepared with a size of $D_{50}$=17 μm.

Comparative Example 2

Lithium secondary battery was manufactured in the same manner as in Example 1, except that the lithium transition metal compound and the silicon carbon composite were prepared as described below.

The lithium transition metal compound used was heat treated at 650° C. for 6 hours under Ar atmosphere, and the crystal grain size of the lithium transition metal compound used was 100 nm. By an airflow pulverization method, the single particles were prepared with a size of $D_{50}$=3.57 μm, and the secondary particles were prepared with a size of $D_{50}$=9.5 μm.

The silicon carbon composite was heat treated at 700° C. for 2 hours under Ar atmosphere, and the Si crystal grain size of the silicon carbon composite used was 17 nm. By an airflow pulverization method, the silicon carbon composite was prepared with a size of $D_{50}$=5.3 μm, and the graphite was prepared with a size of $D_{50}$=17 μm.

Comparative Example 3

Lithium secondary battery was manufactured in the same manner as in Example 1, except that the lithium transition metal compound and the silicon carbon composite were prepared as described below.

The lithium transition metal compound used was heat treated at 750° C. for 8 hours under Ar atmosphere, and the crystal grain size of the lithium transition metal compound used was 120 nm. By an airflow pulverization method, the single particles were prepared with a size of $D_{50}$=3.60 μm, and the secondary particles were prepared with a size of $D_{50}$=10.5 μm.

The silicon carbon composite was heat treated at 700° C. for 2 hours under Ar atmosphere, and the Si crystal grain size of the silicon carbon composite used was 20 nm. By an airflow pulverization method, the silicon carbon composite was prepared with a size of $D_{50}$=5.1 μm, and the graphite was prepared with a size of $D_{50}$=17 μm.

Comparative Example 4

Lithium secondary battery was manufactured in the same manner as in Example 1, except that the lithium transition metal compound and the silicon carbon composite were prepared as described below.

The lithium transition metal compound used was heat treated at 800° C. for 10 hours under Ar atmosphere, and the crystal grain size of the lithium transition metal compound used was 140 nm. By an airflow pulverization method, the single particles were prepared with a size of $D_{50}$=3.74 μm, and the secondary particles were prepared with a size of $D_{50}$=16.5 μm.

The silicon carbon composite was heat treated at 900° C. for 2 hours under Ar atmosphere, and the Si crystal grain size of the silicon carbon composite used was 41 nm. By an airflow pulverization method, the silicon carbon composite was prepared with a size of $D_{50}$=6.8 μm, and the graphite was prepared with a size of $D_{50}$=17 μm.

Comparative Example 5

Lithium secondary battery was manufactured in the same manner as in Example 1, except that the lithium transition metal compound and the silicon carbon composite were prepared as described below.

The lithium transition metal compound used was heat treated at 650° C. for 6 hours under Ar atmosphere, and the crystal grain size of the lithium transition metal compound used was 80 nm. By an airflow pulverization method, the single particles were prepared with a size of $D_{50}$=3.52 μm, and the secondary particles were prepared with a size of $D_{50}$=12.5 μm.

The silicon carbon composite was heat treated at 400° C. for 2 hours under Ar atmosphere, and the Si crystal grain size of the silicon carbon composite used was 10 nm. By an airflow pulverization method, the silicon carbon composite was prepared with a size of $D_{50}$=6.9 μm, and the graphite was prepared with a size of $D_{50}$=17 μm.

Comparative Example 6

Lithium secondary battery was manufactured in the same manner as in Example 1, except that the lithium transition metal compound and the silicon carbon composite were prepared as described below.

The lithium transition metal compound used was heat treated at 650° C. for 6 hours under Ar atmosphere, and the crystal grain size of the lithium transition metal compound used was 88 nm. By an airflow pulverization method, the single particles were prepared with a size of $D_{50}$=3.52 μm, and the secondary particles were prepared with a size of $D_{50}$=12.7 μm.

The silicon carbon composite was heat treated at 400° C. for 2 hours under Ar atmosphere, and the Si crystal grain size of the silicon carbon composite used was 10 nm. By an airflow pulverization method, the silicon carbon composite was prepared with a size of $D_{50}$=6.8 μm, and the graphite was prepared with a size of $D_{50}$=17 μm.

Comparative Example 7

Lithium secondary battery was manufactured in the same manner as in Example 1, except that the lithium transition metal compound and the silicon carbon composite were prepared as described below.

The lithium transition metal compound used was heat treated at 650° C. for 6 hours under Ar atmosphere, and the crystal grain size of the lithium transition metal compound used was 80 nm. By an airflow pulverization method, the single particles were prepared with a size of $D_{50}$=3.52 μm, and the secondary particles were prepared with a size of $D_{50}$=12.5 μm.

The silicon carbon composite was heat treated at 400° C. for 2 hours under Ar atmosphere, and the Si crystal grain size of the silicon carbon composite used was 9 nm. By an airflow pulverization method, the silicon carbon composite was prepared with a size of $D_{50}$=7.1 μm, and the graphite was prepared with a size of $D_{50}$=17 μm.

The configurations of the negative electrode active materials and positive electrode active materials prepared in the Examples and Comparative Examples are shown in the following Table 1.

TABLE 1

| | Crystal grains | | | Positive electrode active material | | | | NEGATIVE ELECTRODE ACTIVE MATERIAL | | | |
|---|---|---|---|---|---|---|---|---|---|---|---|
| | Lithium transition metal compound Crystal grains (A) (nm) | Silicon carbon composite Si crystal grains (B) (nm) | Ratio (%) of B to A | Single particles $D_{50}$ (μm) | Single particles Content (wt %) | Secondary particles $D_{50}$ (μm) | Secondary particles Content (wt %) | Silicon carbon composite $D_{50}$ (μm) | Silicon carbon composite Content (wt %) | Graphite $D_{50}$ (μm) | Graphite content (wt %) |
| Example 1 | 110 | 6 | 5.5 | 3.57 | 50 | 9.5 | 50 | 5.2 | 10 | 17 | 90 |
| Example 2 | 120 | 1.5 | 1.3 | 3.58 | 50 | 14.7 | 50 | 6.2 | 10 | 17 | 90 |
| Example 3 | 105 | 9 | 8.6 | 3.63 | 50 | 10.5 | 50 | 7.1 | 10 | 17 | 90 |
| Example 4 | 150 | 4 | 2.7 | 3.72 | 50 | 9.5 | 50 | 6.3 | 10 | 17 | 90 |
| Example 5 | 110 | 10 | 9.1 | 3.57 | 50 | 9.5 | 50 | 6.9 | 10 | 17 | 90 |
| Example 6 | 140 | 12 | 8.6 | 3.74 | 50 | 16.5 | 50 | 7.0 | 10 | 17 | 90 |
| Comparative Example 1 | 110 | 12 | 10.9 | 3.63 | 50 | 9.6 | 50 | 7.0 | 10 | 17 | 90 |
| Comparative Example 2 | 100 | 17 | 17 | 3.57 | 50 | 9.5 | 50 | 5.3 | 10 | 17 | 90 |
| Comparative Example 3 | 120 | 20 | 16.7 | 3.60 | 50 | 10.5 | 50 | 5.1 | 10 | 17 | 90 |
| Comparative Example 4 | 140 | 41 | 29.3 | 3.74 | 50 | 16.5 | 50 | 6.8 | 10 | 17 | 90 |

TABLE 1-continued

| | Crystal grains | | | | | | | NEGATIVE ELECTRODE ACTIVE MATERIAL | | | |
|---|---|---|---|---|---|---|---|---|---|---|---|
| | Lithium transition metal compound Crystal grains (A) (nm) | Silicon carbon composite Si crystal grains (B) (nm) | Ratio (%) of B to A | Positive electrode active material | | | | Silicon carbon composite $D_{50}$ (μm) | Silicon carbon composite Content (wt %) | Graphite $D_{50}$ (μm) | Graphite content (wt %) |
| | | | | Single particles $D_{50}$ (μm) | Single particles Content (wt %) | Secondary particles $D_{50}$ (μm) | Secondary particles Content (wt %) | | | | |
| Comparative Example 5 | 80 | 10 | 12.5 | 3.52 | 50 | 12.5 | 50 | 6.9 | 10 | 17 | 90 |
| Comparative Example 6 | 88 | 10 | 11.4 | 3.52 | 50 | 12.7 | 50 | 6.8 | 10 | 17 | 90 |
| Comparative Example 7 | 80 | 9 | 11.3 | 3.52 | 50 | 12.5 | 50 | 7.1 | 10 | 17 | 90 |

The sizes of crystal grains of the lithium transition metal compound and Si crystal grains included in the silicon carbon composite may be confirmed by X-ray diffraction analysis, and the X-ray diffraction analysis was performed by an X-ray diffraction analysis (XRD) analyzer (trade name: D4-endavor, manufacturer: Bruker). Specifically, the XRD measurement was performed by sampling a powder-type sample in a holder and using Cu K alpha X-rays.

The size of crystal grains of the lithium transition metal compound was calculated by fitting the XRD results using the Scherrer equation, and in this case, the reference of crystal grains was measured based on the peak appearing at the corresponding position. ($2\theta=10°$ to $12°$) The size of Si crystal grains was calculated by fitting the XRD results using the Scherrer equation, and in this case, the reference of crystal grains was measured based on Si(220). ($2\theta=47.4°$ to $48.5°$)

The $D_{50}$ of each of the positive electrode active material and the negative electrode active material was analyzed by a PSD measurement method using a Microtac apparatus.

Experimental Example: Evaluation of Discharge Capacity, Initial Efficiency, and Service Life (Capacity Retention Rate) Characteristics The discharge capacity, initial efficiency, and capacity retention rate were evaluated by charging and discharging the lithium secondary batteries manufactured in the Examples and the Comparative Examples, and are shown in the following Table 2.

For the 1st and 2nd cycles, the battery was charged and discharged at 0.1 C, and from the 3rd cycle to the 199th cycle, the battery was charged and discharged at 0.5 C. The 200th cycle was completed in a charged state (with lithium contained in the negative electrode).

Charging conditions: CC (constant current)/CV (constant voltage) (5 mV/0.005 C current cut-off)

Discharging conditions: CC (constant current) conditions 1.5 V

The discharge capacity (mAh/g) and initial efficiency (%) were derived from the results during one-time charge/discharge. Specifically, the initial efficiency (%) was derived by the following calculation.

$$\text{Initial efficiency (\%)} = (\text{1 time discharge capacity}/\text{1 time charge capacity}) \times 100$$

The charge retention rate was each derived by the following calculation.

$$\text{Capacity retention rate (\%)} = (\text{199 times discharge capacity}/\text{1 time discharge capacity}) \times 100$$

Experimental Example: Evaluation of Cell Thickness

The thicknesses of the secondary battery manufactured above were compared before and after the battery was cycled as described below.

For the 1st and 2nd cycles, the battery was charged and discharged at 0.1 C, and from the 3rd cycle to the 200th cycle, the battery was charged and discharged at 0.5 C. The thickness was calculated using the following equation, by setting the thickness of the cell after the 2nd cycle as the Initial thickness and the thickness of the cell after the 200th cycle as the After thickness. The calculated cell thickness in Example 1 was set to 100%, and the cell thicknesses in Examples 2 to 6 and Comparative Examples 1 to 7 were relatively calculated based on the calculated thickness, and are shown in the following Table 2.

$$\text{Cell thickness} = (\text{After thickness} - \text{Initial thickness})/(\text{Initial thickness}) \times 100$$

TABLE 2

| Battery | Discharge capacity (mAh/g) | Initial efficiency (%) | Capacity retention rate (Room temperature 200 cycle, %) | Cell thickness (based on Example 1) (Room temperature 200 cycle, %) |
|---|---|---|---|---|
| Example 1 | 454 | 92.2 | 94 | 100 |
| Example 2 | 454 | 92.1 | 97 | 85 |
| Example 3 | 454 | 92.3 | 90 | 105 |
| Example 4 | 454 | 92.2 | 95 | 93 |
| Example 5 | 454 | 91.9 | 87 | 109 |
| Example 6 | 454 | 92.0 | 89 | 107 |

TABLE 2-continued

| Battery | Discharge capacity (mAh/g) | Initial efficiency (%) | Capacity retention rate (Room temperature 200 cycle, %) | Cell thickness (based on Example 1) (Room temperature 200 cycle, %) |
|---|---|---|---|---|
| Comparative Example 1 | 454 | 92.0 | 85 | 120 |
| Comparative Example 2 | 454 | 92.2 | 80 | 150 |
| Comparative Example 3 | 454 | 92.1 | 70 | 160 |
| Comparative Example 4 | 454 | 92.3 | 50 | 220 |
| Comparative Example 5 | 454 | 92.2 | 76 | 140 |
| Comparative Example 6 | 454 | 91.7 | 80 | 126 |
| Comparative Example 7 | 454 | 91.7 | 83 | 122 |

According to Tables 1 and 2 above, it could be confirmed that the secondary batteries of Examples 1 to 6 in which the size of the Si crystal grains of the silicon carbon composite satisfies 10% or less of the size of the crystal grains of the lithium transition metal compound had a small cell thickness and exhibited an excellent capacity retention rate, compared to Comparative Examples 1 to 7. This seems to show that since the size of the Si crystal grains of the silicon carbon composite is 10% or less of the size of the crystal grains of the lithium transition metal compound, stress due to volume expansion of the negative electrode active material particles may be reduced during charging and discharging, and accordingly, cycle characteristics and swelling performance are improved as the cracking of the particles is reduced.

Conversely, in the case of Comparative Examples 1 to 7, it could be confirmed that because the size of the Si crystal grains of the silicon carbon composite exceeds 10% of the size of the crystal grains of the lithium transition metal compound, cracks occurred in the particles due to an increase in internal stress of Si according to charging and discharging, resulting in a deterioration in cycle performance.

In particular, in the case of Example 5 and Comparative Example 5, in the case of Example 6 and Comparative Example 1, and in the case of Example 3 and Comparative Example 7, different effects were derived according to the size of the crystal grains of the positive electrode active material even though the sizes of the Si crystal grains of the silicon carbon composite are the same. Therefore, it can be confirmed that the cycle characteristics and degree of swelling can be improved according to the relative size of the Si crystal grain size of the silicon carbon composite and the size of the crystal grains of the positive electrode active material.

What is claimed is:

1. A lithium secondary battery, comprising:

a positive electrode comprising a positive electrode active material;

a negative electrode comprising a negative electrode active material;

a separator between the positive electrode and the negative electrode; and an electrolyte, wherein the positive electrode active material comprises a lithium transition metal compound comprising nickel (Ni), cobalt (Co) and manganese (Mn), wherein the lithium transition metal compound comprises a form of single particles having at least one of a single primary particle or an aggregate of 2 or more and 30 or less of primary particles, wherein the single particles comprise crystal grains of the lithium transition metal compound therein, wherein the negative electrode active material comprises a silicon carbon composite having Si crystal grains therein, wherein the size of the Si crystal grains of the silicon carbon composite is 1.3% to 9.1% of the size of the crystal grains of the lithium transition metal compound, wherein the size of the Si crystal grains of the silicon carbon composite is 0.1 nm or more and 20 nm or less, and wherein the primary particles have an average particle diameter of 0.5 μm to 2.8 μm.

2. The lithium secondary battery of claim 1, wherein the single particles have a particle strength of 100 to 300 MPa when rolled with a force of 650 $kgf/cm^2$.

3. The lithium secondary battery of claim 1, wherein the size of the crystal grains of the lithium transition metal compound is 100 nm or more and 200 nm or less.

4. The lithium secondary battery of claim 1, wherein the lithium transition metal compound further comprises a form of secondary particles which is an aggregate of more than 30 primary particles.

5. The lithium secondary battery of claim 4, wherein the secondary particles have an average particle diameter of 1 μm or more and 20 μm or less.

6. The lithium secondary battery of claim 1, wherein the negative electrode active material further comprises graphite.

7. The lithium secondary battery of claim 6, wherein the graphite comprises a natural graphite, an artificial graphite, or a combination thereof.

8. The lithium secondary battery of claim 6, wherein the graphite comprises an artificial graphite and a natural graphite, and a weight ratio of the artificial graphite to the natural graphite is 50:50 to 90:10.

9. The lithium secondary battery of claim 6, the graphite has an average particle diameter of 10 μm to 20 μm.

10. The lithium secondary battery of claim 6, wherein an average particle diameter of the silicon carbon composite is smaller than an average particle diameter of the graphite.

11. The lithium secondary battery of claim 1, wherein the single particles have an average particle diameter of 1 μm or more and 12 μm or less.

12. The lithium secondary battery of claim 1, wherein the silicon carbon composite has an average particle diameter of 1 μm or more and 15 μm or less.

13. The lithium secondary battery of claim 1, wherein an average particle diameter of the single particles is smaller than an average particle diameter of the silicon carbon composite.

14. The lithium secondary battery of claim 1, wherein:

the single particles are comprised in an amount of 15 parts by weight to 100 parts by weight with respect to 100 parts by weight of the positive electrode active material, and the silicon carbon composite is comprised in an amount of 3 parts by weight to 30 parts by weight with respect to 100 parts by weight of the negative electrode active material.

15. The lithium secondary battery of claim 1, wherein the lithium transition metal compound comprises 80 mol % or more and less than 100 mol % of nickel among the metals except for lithium.

16. The lithium secondary battery of claim 1, wherein:

the positive electrode comprises a positive electrode active material layer comprising the positive electrode active material, the negative electrode comprises a negative electrode active material layer comprising the negative electrode active material, and the positive electrode active material layer and the negative electrode active material layer have a thickness of 10 μm or more and 500 μm or less, respectively.

17. A battery pack, comprising:

a lithium secondary battery, wherein the lithium secondary battery comprises:

a positive electrode comprising a positive electrode active material;

a negative electrode comprising a negative electrode active material;

a separator between the positive electrode and the negative electrode; and an electrolyte, wherein the positive electrode active material comprises a lithium transition metal compound comprising nickel (Ni), cobalt (Co) and manganese (Mn), wherein the lithium transition metal compound comprises a form of single particles having at least one of a single primary particle or an aggregate of 2 or more and 30 or less of primary particles, wherein the single particles comprise crystal grains of the lithium transition metal compound therein, wherein the negative electrode active material comprises a silicon carbon composite having Si crystal grains therein, wherein the size of the Si crystal grains of the silicon carbon composite is 1.3% to 9.1% of the size of the crystal grains of the lithium transition metal compound, wherein the size of the Si crystal grains of the silicon carbon composite is 0.1 nm or more and 20 nm or less, and wherein the primary particles have an average particle diameter of 0.5 μm to 2.8 μm.

18. An electronic device, comprising:

the lithium secondary battery of claim 1.

* * * * *